United States Patent
Tian

(10) Patent No.: US 10,988,255 B1
(45) Date of Patent: Apr. 27, 2021

(54) MULTI-ROTOR AIRCRAFT WITH MULTI-AXIS MISALIGNMENT LAYOUT

(71) Applicant: Shanghai Autoflight Co., Ltd., Shanghai (CN)

(72) Inventor: Yu Tian, Hong Kong (CN)

(73) Assignee: Shanghai Autoflight Co., Ltd., Shanghai (CN)

( * ) Notice: Subject to any disclaimer, the term of this patent is extended or adjusted under 35 U.S.C. 154(b) by 0 days.

(21) Appl. No.: 16/838,048

(22) Filed: Apr. 2, 2020

(30) Foreign Application Priority Data

Dec. 18, 2019 (CN) .......................... 201911307445.3

(51) Int. Cl.
  *B64C 39/02* (2006.01)
  *B64C 1/08* (2006.01)
  *B64C 27/00* (2006.01)

(52) U.S. Cl.
  CPC .............. *B64C 39/024* (2013.01); *B64C 1/08* (2013.01); *B64C 27/008* (2013.01); *B64C 2201/108* (2013.01); *B64C 2201/146* (2013.01); *B64C 2201/165* (2013.01)

(58) Field of Classification Search
  CPC .... B64C 27/08; B64C 27/02; B64C 2201/108
  See application file for complete search history.

(56) References Cited

U.S. PATENT DOCUMENTS

| | | | | |
|---|---|---|---|---|
| 2017/0305537 A1* | 10/2017 | Smith | .................... | B64C 39/024 |
| 2019/0031332 A1* | 1/2019 | Dogru | .................... | B64C 27/14 |
| 2019/0135424 A1* | 5/2019 | Baity | ..................... | B64C 11/46 |
| 2019/0161190 A1* | 5/2019 | Gil | ........................ | G06Q 10/083 |
| 2019/0256201 A1* | 8/2019 | Plekhanov | .............. | B64C 27/08 |
| 2020/0140087 A1* | 5/2020 | Fulbright | ............... | B64D 47/00 |
| 2020/0223544 A1* | 7/2020 | Kelly | .................... | B64C 39/024 |
| 2020/0346746 A1* | 11/2020 | Duffy | .................... | B64C 39/024 |

FOREIGN PATENT DOCUMENTS

| | | | | |
|---|---|---|---|---|
| EP | 3482618 B1 * | 4/2020 | ............. | A01C 21/00 |
| WO | WO-2018172815 A1 * | 9/2018 | ........... | B64C 39/024 |

* cited by examiner

*Primary Examiner* — Richard R. Green
*Assistant Examiner* — William L Gmoser
(74) *Attorney, Agent, or Firm* — WPAT Law, P.C.; Anthony King

(57) ABSTRACT

The present invention discloses a multi-rotor aircraft with a multi-axis misalignment layout, which comprises a frame, a plurality of upper power sources, a plurality of lower power sources, a plurality of upper propellers, and a plurality of lower propellers. The plurality of upper propellers are provided at intervals and are connected to the upper part of the frame through the plurality of upper power sources. The plurality of lower propellers are provided at intervals and are connected to the lower part of the frame through the plurality of lower power sources. In the vertical projection direction of the frame, the plurality of upper propellers and the plurality of lower propellers are staggered. The upper propellers and the lower propellers are staggered so that the pitch between the upper propellers and the lower propellers is large.

12 Claims, 2 Drawing Sheets

MULTI-ROTOR AIRCRAFT WITH MULTI-AXIS MISALIGNMENT LAYOUT

CROSS-REFERENCE TO RELATED APPLICATIONS

This application claims priority to China patent application No. 201911307445.3, filed on Dec. 18, 2019, now pending, which is hereby incorporated by reference in its entirety.

TECHNICAL FIELD

The present application relates to the technical field of multi-rotor aircrafts, and in particular to a multi-rotor aircraft with a multi-axis misalignment layout of an internal spider-like web and a compact structure.

BACKGROUND

The multi-rotor aircraft in the prior art is more commonly designed with 4 shafts and 8 propellers, and 8 shafts and 8 propellers. According to different design requirements and layouts, there are various frame structures such as X-type, H-type, and Y-type.

The multi-rotor aircraft with 4 shafts and 8 propellers is designed coaxially. The power shaft of the motor corresponding to the 4 propellers on the upper layer and the power shaft of the motor corresponding to the 4 propellers on the lower layer are in one-to-one correspondence. The pitch between the upper propellers and the lower propellers is small, the upper propellers and the lower propellers overlap in the vertical projection direction, and the propeller efficiency is low. In addition, in this multi-rotor aircraft, the frame is a cantilever structure, and the rigidity of the fuselage is poor.

The multi-rotor aircraft with 8 shafts and 8 propellers is designed non-coaxially. The 8 propellers are provided at intervals on the same plane. The overall size of the aircraft is large, the volume of the aircraft is large, the weight is large, and the flight resistance is also large. In addition, similar to a multi-rotor aircraft with 4 shafts and 8 propellers, the frame of this multi-rotor aircraft is also a cantilever structure, and the rigidity of the fuselage is also poor.

In summary, the multi-rotor aircraft in the prior art has the defects of greater flight resistance, larger volume, poorer fuselage rigidity, and lower propeller efficiency at the same load capacity.

SUMMARY

The technical problem to be solved by the present invention is to provide a multi-rotor aircraft with a multi-axis misalignment layout to overcome the defects that the multi-rotor aircraft in the prior art has greater flight resistance, larger volume, and lower propeller efficiency at the same load capacity.

The present invention solves the above technical problems through the following technical solutions:

A multi-rotor aircraft with a multi-axis misalignment layout, comprising a frame, a plurality of upper power sources, and a plurality of lower power sources, wherein the multi-rotor aircraft further comprises:

a plurality of upper propellers, which are provided at intervals and are connected above the frame through the plurality of upper power sources; and a plurality of lower propellers, which are provided at intervals and are connected below the frame through the plurality of lower power sources;

wherein in the vertical projection direction of the frame, the plurality of upper propellers and the plurality of lower propellers are staggered.

In this solution, the upper propellers and the lower propellers are staggered so that the pitch between the upper propellers and the lower propellers is large. The central axis of the upper power sources and the central axis of the lower power sources are not collinear or overlapped. In the vertical projection direction of the frame, the overlapping area between the upper propellers and the lower propellers is less. Compared with the coaxial multi-rotor aircraft with 4 shafts and 8 propellers in the prior art, the vertical difference between the upper propellers and the lower propellers of the multi-rotor aircraft with a multi-axis misalignment layout is larger, the mutual disturbance between the propellers is smaller, the propeller efficiency is higher, the corresponding propeller rotating speed is lower, and the noise is lower. Compared with the multi-rotor aircraft with 8 shafts and 8 propellers in the prior art, the overall size of the multi-rotor aircraft with a multi-axis misalignment layout is greatly reduced, and the fuselage weight, volume and flight resistance are also significantly reduced. Therefore, compared with the multi-rotor aircraft in the prior art, the multi-rotor aircraft with the multi-axis misalignment layout can significantly reduce flight resistance and volume, and improve propeller efficiency at the same load capacity.

Preferably, a misalignment angle is formed between the connection between the center of any one of the upper propellers and the center of an adjacent one of the lower propellers and the horizontal plane of the frame, and the range of the misalignment angles is 0° to 89°.

In this solution, using the above configuration, the relative positions of the upper propellers and the lower propellers can be adjusted according to the layout needs.

Preferably, the connection between the center of any one of the lower propellers and the center of two adjacent upper propellers forms a triangle.

In this solution, using the above configuration, on the basis of ensuring the propeller efficiency to a certain degree, it is beneficial to reducing the overall size of the multi-rotor aircraft, and further reducing the weight and volume of the multi-rotor aircraft.

Preferably, the plurality of upper propellers and the plurality of lower propellers are horizontally staggered.

In this solution, using the above configuration, on the basis of ensuring the propeller efficiency to a certain degree, it is beneficial to further reducing the overall size of the multi-rotor aircraft, and further reducing the weight and volume of the multi-rotor aircraft.

Preferably, the plurality of upper propellers and the plurality of lower propellers are staggered horizontally and equidistantly.

In this solution, using the above configuration, in the assembly process of the multi-rotor aircraft, there are fewer restrictions on the upper propellers and the lower propellers, which is beneficial to rapid assembly.

Preferably, the frame comprises:

a frame center part;

a plurality of connecting arms having a first end and a second end in an extending direction, wherein the first end of the plurality of connecting arms is connected to the frame center part, and the second end of the plurality of connecting arms is correspondingly connected with the plurality of upper power sources, the plurality of upper propellers, the plurality of lower power sources, and the plurality of lower propellers; and at least one reinforcing arm, wherein an accommodating area is formed between the second ends of any two adjacent connecting arms, and at least one of the accommodating areas formed between the plurality of connecting arms is provided with the reinforcing arm.

In this solution, using the above configuration, the configuration of the reinforcing arm makes the corresponding connecting arm no longer a cantilever structure, but a structure that can form an approximately triangular shape with the adjacent connecting arm, which is beneficial to improving the rigidity of the fuselage and reducing vibration resulted from deformation of the aircraft itself.

Preferably, the reinforcing arm is provided in each of the accommodation areas formed between the plurality of connecting arms.

In this solution, using the above configuration, all the connecting arms are no longer cantilever structures under the action of the reinforcing arm, which is beneficial to significantly improving the rigidity of the fuselage, and significantly reducing the vibration resulted from deformation of the aircraft itself.

Preferably, the connecting arm, the reinforcing arm, and the frame center part are formed as an integrated structure through a detachable or fixed connection.

In this solution, using the above configuration is beneficial to rapid assembly of the aircraft.

Preferably, the connecting arm is integrally formed with the reinforcing arm and the frame center part.

In this solution, the above configuration is used to eliminate the connection structure, which not only eliminates the complicated connection process, but also is beneficial to reducing the overall weight of the aircraft, and further reducing the flight resistance of the aircraft.

Preferably, the upper propeller and the upper power source are connected to the top of the corresponding connecting arm, and the lower propeller and the lower power source are connected to the bottom of the corresponding connecting arm.

In this solution, the above configuration is used to ensure that on the basis that the upper propellers and the lower propellers are staggered, the aircraft can be more compactly provided, which is beneficial to further reducing the overall volume of the aircraft.

Preferably, the multi-rotor aircraft comprises an upper part and a lower part which are detachably connected;

wherein the upper part comprises the frame, the plurality of upper propellers, the plurality of upper power sources, the plurality of lower propellers, and the plurality of lower power sources;

the lower part comprises a landing gear and an operating load unit which are connected, the operating load unit comprises a load and an energy load module, the energy load module is configured to supply power to the upper power source and the lower power source, the load and the landing gear are connected to the energy load module, and the energy load module is detachably connected below the frame.

In this solution, using the above configuration, the multi-rotor aircraft mainly comprises an upper part and a lower part. On the one hand, the upper part and the lower part can be transported separately, and the requirements for transportation conditions are lower. On the other hand, after being connected together, the upper part and the lower part can realize the assembly of the multi-rotor aircraft. The assembly is relatively convenient and fast, which is beneficial to reducing the preparation work before take-off and to improving the rapid response capability of the multi-rotor aircraft. In this solution, the energy load module is assembled with the landing gear and is provided below the frame.

Preferably, the multi-rotor aircraft comprises an upper part and a lower part which are detachably connected;

wherein the upper layer part comprises the frame, the plurality of upper propellers, the plurality of upper power sources, the plurality of lower propellers, the plurality of lower power sources and the energy load module, the energy load module is used to supply power to the upper power source and the lower power source, and the energy load module is connected above the frame;

the lower part comprises a landing gear and a load, and the landing gear and the load are connected below the frame.

In this solution, using the above configuration, the multi-rotor aircraft mainly comprises an upper part and a lower part. On the one hand, the upper part and the lower part can be transported separately, and the requirements for transportation conditions are lower. On the other hand, after being connected together, the upper part and the lower part can realize the assembly of the multi-rotor aircraft. The assembly is relatively convenient and fast, which is beneficial to reducing the preparation work before take-off and to improving the rapid response capability of the multi-rotor aircraft. In this solution, the energy load module is assembled with the frame and is provided above the frame.

Preferably, the frame comprises: a frame center part and a plurality of connecting arms, the connecting arm have a first end and a second end in an extending direction, the first end of the plurality of connecting arms is connected to the frame center part, and the second end of the plurality of connecting arms is correspondingly connected with the plurality of upper power sources, the plurality of upper propellers, the plurality of lower power sources, and the plurality of lower propellers;

wherein a first connecting arm of the plurality of connecting arms is used to connect the plurality of upper propellers, and a second connecting arm of the plurality of connecting arms is used to connect the plurality of lower propellers;

an edge of the energy load module extends to the plurality of first connection arms and is detachably connected to the plurality of first connection arms.

In this solution, if the size of the energy load module is large and needs to be extended to the position corresponding to the connection arm, connecting the energy load module to the connection arm is convenient and reliable. In addition, compared with connecting the energy load module to the second connection arm, connecting the energy load module to the first connection arm is beneficial to avoiding interference between the energy load module and the lower propeller, beneficial to protecting the lower propeller, and beneficial to improving the reliability of the multi-rotor aircraft.

Preferably, the number of the upper propellers and the number of the lower propellers are both four.

On the basis of conforming to common knowledge in the art, the above preferred conditions can be arbitrarily combined to obtain each preferred embodiment of the present invention.

The positive progress effect of the present application is as follows:

In the multi-rotor aircraft with a multi-axis misalignment layout, the upper propellers and the lower propellers are staggered so that the pitch between the upper propellers and the lower propellers is large. The central axis of the upper power sources and the central axis of the lower power sources are not collinear or overlapped. In the vertical projection direction of the frame, the overlapping area between the upper propellers and the lower propellers is less. Compared with the coaxial multi-rotor aircraft with 4 shafts and 8 propellers in the prior art, the vertical difference between the upper propellers and the lower propellers of the multi-rotor aircraft with a multi-axis misalignment layout is larger, the mutual disturbance between the propellers is smaller, the propeller efficiency is higher, the corresponding propeller rotating speed is lower, and the noise is lower. Compared with the multi-rotor aircraft with 8 shafts and 8 propellers in the prior art, the overall size of the multi-rotor aircraft with a multi-axis misalignment layout is greatly reduced, and the fuselage weight, volume and flight resistance are also significantly reduced. Therefore, compared with the multi-rotor aircraft in the prior art, the multi-rotor aircraft with the multi-axis misalignment layout can significantly reduce flight resistance and volume, and improve propeller efficiency at the same load capacity.

Figure 1:
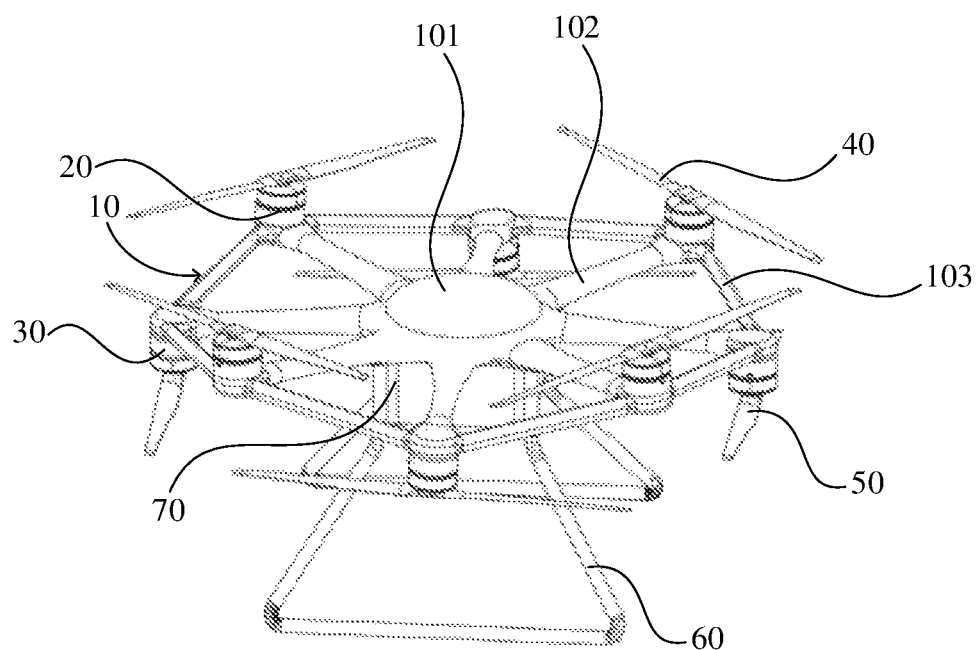
FIG. 1 is a schematic diagram of a three-dimensional structure of a multi-rotor aircraft with a multi-axis misalignment layout according to a preferred embodiment of the present invention.

DESCRIPTION OF REFERENCE NUMBERS 10 a frame
101 a frame center part
102 a connecting arm
103 a reinforcing arm
20 an upper power source
30 a lower power source
40 an upper propeller
50 a lower propellers
60 a landing gear
70 an energy load module

DESCRIPTION OF THE EMBODIMENTS

The present invention is further described below by way of examples, but the present invention is not limited to the scope of the embodiments.

This embodiment discloses a multi-rotor aircraft with a multi-axis misalignment layout. As shown in FIG. 1-4, the multi-rotor aircraft comprises a frame 10, a plurality of upper power sources 20, a plurality of lower power sources 30, a plurality of upper propellers 40, and a plurality of lower propellers 50. The plurality of upper propellers 40 are provided at intervals and are connected above the frame 10 through the plurality of upper power sources 20. The plurality of lower propellers 50 are provided at intervals and are connected below the frame 10 through the plurality of lower power sources 30. In the vertical projection direction of the frame 10, the plurality of upper propellers 40 and the plurality of lower propellers 50 are staggered.

In the present embodiment, the upper propellers 40 and the lower propellers 50 are staggered so that the pitch between the upper propellers 40 and the lower propellers 50 is large. The central axis of the upper power sources 20 and the central axis of the lower power sources 30 are not collinear or overlapped. In the vertical projection direction of the frame 10, the overlapping area between the upper propellers 40 and the lower propellers 50 is less. Compared with the coaxial multi-rotor aircraft with 4 shafts and 8 propellers in the prior art, the vertical difference between the upper propellers 40 and the lower propellers 50 of the multi-rotor aircraft with a multi-axis misalignment layout is larger, the mutual disturbance between the propellers is smaller, the propeller efficiency is higher, the corresponding propeller rotating speed is lower, and the noise is lower. Compared with the multi-rotor aircraft with 8 shafts and 8 propellers in the prior art, the overall size of the multi-rotor aircraft with a multi-axis misalignment layout is greatly reduced, and the fuselage weight, volume and flight resistance are also significantly reduced. Therefore, compared with the multi-rotor aircraft in the prior art, the multi-rotor aircraft with the multi-axis misalignment layout can significantly reduce flight resistance and volume, and improve propeller efficiency at the same load capacity.

It should be noted that, in the present embodiment, the upper power source 20 and the lower power source 30 are both motors. In other alternative embodiments, other types of power sources can also be used according to the actual needs.

In addition, in the present embodiment, as shown in FIGS. 1-4, the number of the upper propellers 40 and the number of the lower propellers 50 are both four, and accordingly, the number of the upper power sources 20 and the number of the lower power sources 30 are also both four. In other alternative embodiments, the number of the upper propellers 40, the lower propellers 50, the upper power sources 20, and the lower power sources 30 may also be set according to the actual layout needs.

Figure 2:
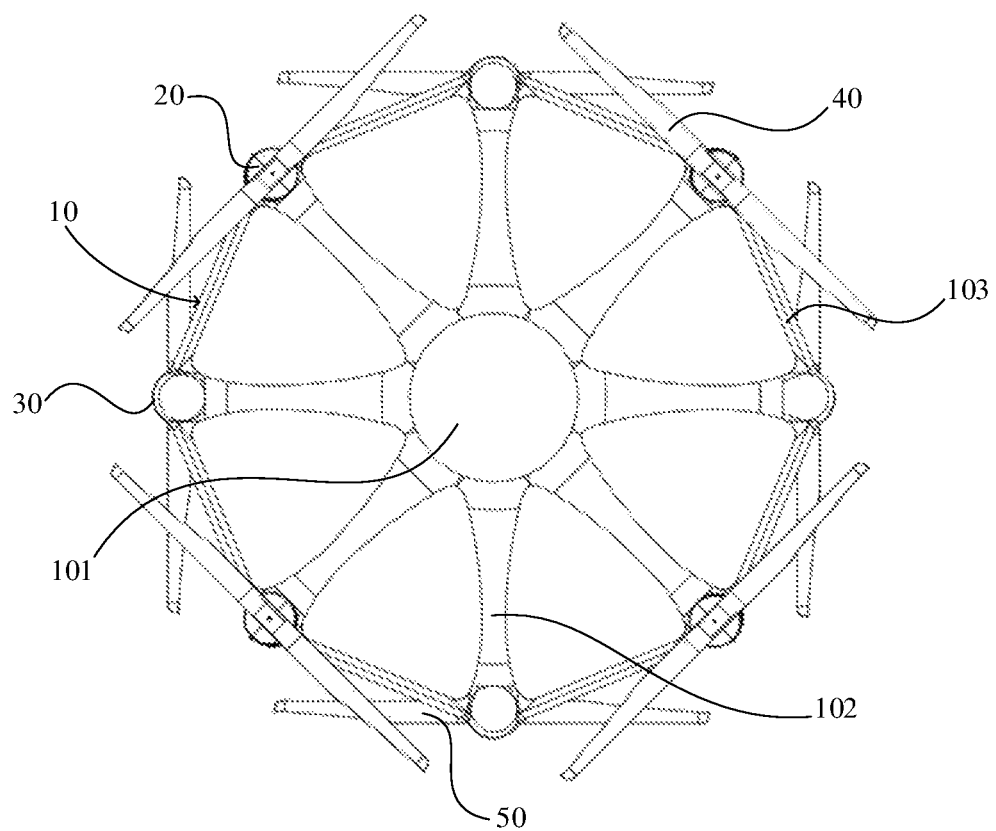
FIG. 2 is a schematic structural diagram of a part of a multi-rotor aircraft with a multi-axis misalignment layout according to a preferred embodiment of the present invention.
Figure 3:
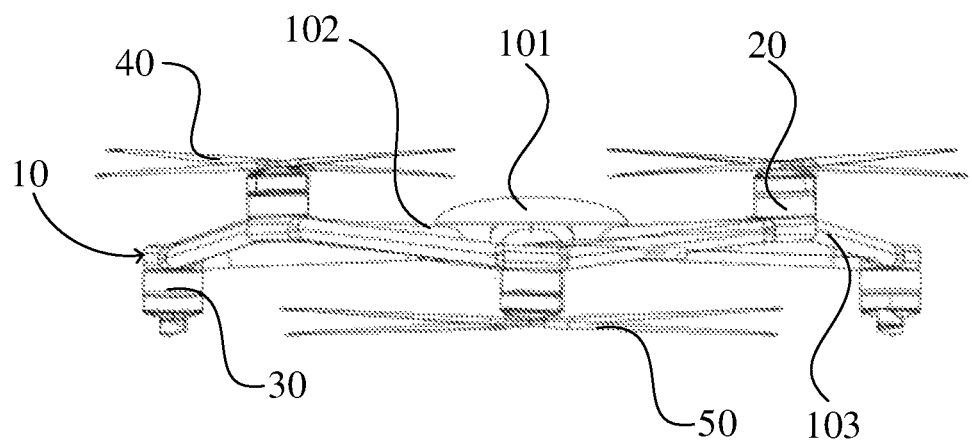
FIG. 3 is a schematic structural diagram of another part of a multi-rotor aircraft with a multi-axis misalignment layout according to a preferred embodiment of the present invention.
Figure 4:
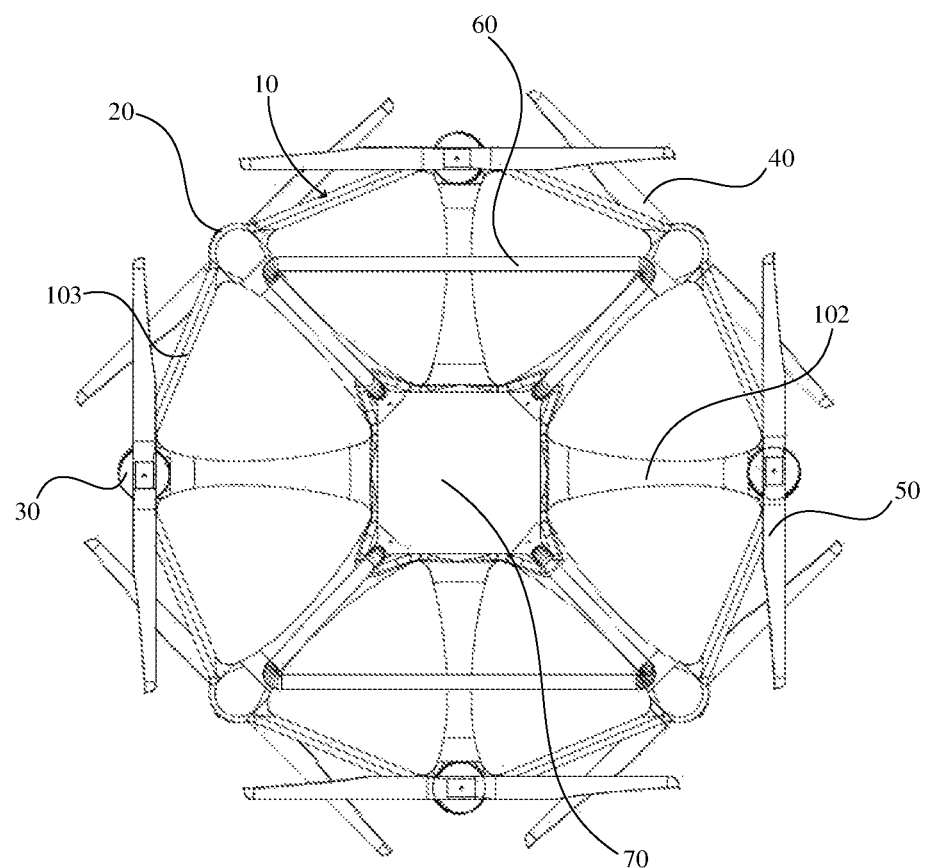
FIG. 4 is a schematic structural diagram of yet another part of a multi-rotor aircraft with a multi-axis misalignment layout according to a preferred embodiment of the present invention.

It is understood with reference to FIGS. 1, 2 and 4 that a misalignment angle is formed between the connection between the center of any one of the upper propellers 40 and the center of an adjacent one of the lower propellers 50 and the horizontal plane of the frame 10, and the range of the misalignment angles is 0° to 89°. Using the above configuration, the relative positions of the upper propellers 40 and the lower propellers 50 can be adjusted according to the layout needs.

Continuing to refer to FIG. 1, FIG. 2, and FIG. 4, it is understood that the connection between the center of any one of the lower propellers 50 and the center of two adjacent upper propellers 40 forms a triangle. Using the above configuration, on the basis of ensuring the propeller efficiency to a certain degree, it is beneficial to reducing the overall size of the multi-rotor aircraft, and further reducing the weight and volume of the multi-rotor aircraft.

Specifically, in the present embodiment, the plurality of upper propellers 40 and the plurality of lower propellers 50 are horizontally staggered. Therefore, on the basis of ensuring the propeller efficiency to a certain degree, it is beneficial to further reducing the overall size of the multi-rotor aircraft, and further reducing the weight and volume of the multi-rotor aircraft. Actually, in the present embodiment, the plurality of upper propellers 40 and the plurality of lower propellers 50 are staggered horizontally and equidistantly. In this way, in the assembly process of the multi-rotor aircraft, there are fewer restrictions on the upper propellers 40 and the lower propellers 50, which is beneficial to rapid assembly.

Of course, in other alternative implementations, according to the actual layout requirements, the staggered arrangement between the upper propellers 40 and the lower propellers 50 may also be non-equidistant.

As shown in FIGS. 1-4, the frame 10 comprises a frame center 101, a plurality of connecting arms 102, and at least one reinforcing arm 103. The connecting arm 102 has a first end and a second end in an extending direction, the first end of the plurality of connecting arms 102 is connected to the frame center part 101, and the second end of the plurality of connecting arms 102 is correspondingly connected with the plurality of upper power sources 20, the plurality of upper propellers 40, the plurality of lower power sources 30, and the plurality of lower propellers 50. An accommodating area is formed between the second ends of any two adjacent connecting arms 102, and at least one of the accommodating areas formed between the plurality of connecting arms 102 is provided with the reinforcing arm 103.

The configuration of the reinforcing arm 103 makes the corresponding connecting arm 102 no longer a cantilever structure, but a structure that can form an approximately triangular shape with the adjacent connecting arm 102, which is beneficial to improving the rigidity of the fuselage and reducing vibration resulted from deformation of the aircraft itself.

Specifically, in the present embodiment, the reinforcing arm 103 is provided in each of the accommodation areas formed between the plurality of connecting arms 102. All the connecting arms 102 are no longer cantilever structures under the action of the reinforcing arm 103, which is beneficial to significantly improving the rigidity of the fuselage, and significantly reducing the vibration resulted from deformation of the aircraft itself.

In the present embodiment, the connecting arm 102 is integrally formed with the reinforcing arm 103, and the frame center part 101. The above configuration eliminates the connection structure, which not only eliminates the complicated connection process, but also is beneficial to reducing the overall weight of the aircraft, and further reducing the flight resistance of the aircraft.

It should be noted that, in other alternative embodiments, the connecting arm 102, the reinforcing arm 103, and the frame center part 101 are formed as an integrated structure through a detachable or fixed connection. The above configuration is beneficial to rapid assembly of the aircraft.

Continuing to refer to FIGS. 1-4, it is understood that the upper propeller 40 and the upper power source 20 are connected to the top of the corresponding connecting arm 102, and the lower propeller 50 and the lower power source 30 are connected to the bottom of the corresponding connecting arm 102. The above configuration is used to ensure that on the basis that the upper propellers 40 and the lower propellers 50 are staggered, the aircraft can be more compactly provided, which is beneficial to further reducing the overall volume of the aircraft.

In the present embodiment, the multi-rotor aircraft comprises an upper part and a lower part which are detachably connected, wherein the upper part comprises the frame 10, the plurality of upper propellers 40, the plurality of upper power sources 20, the plurality of lower propellers 50, and the plurality of lower power sources 30. The lower part comprises a landing gear 60 and an operating load unit which are connected, the operating load unit comprises a load (not shown in the figure) and an energy load module 70, the energy load module 70 is configured to supply power to the upper power source 20 and the lower power source 30, the load and the landing gear 60 are connected to the energy load module 70, and the energy load module 70 is detachably connected below the frame 10.

The specific load depends on the purpose of the multi-rotor aircraft. The load can be a fire extinguishing bomb or other materials such as pesticides. The energy load module 70 may be a battery.

Using the above configuration, the multi-rotor aircraft mainly comprises an upper part and a lower part. On the one hand, the upper part and the lower part can be transported separately, and the requirements for transportation conditions are lower. On the other hand, after being connected together, the upper part and the lower part can realize the assembly of the multi-rotor aircraft. The assembly is relatively convenient and fast, which is beneficial to reducing the preparation work before take-off and to improving the rapid response capability of the multi-rotor aircraft. The energy load module 70 is assembled with the landing gear 60 and is provided below the frame 10.

It is understood with reference to FIG. 1 and FIG. 4 that a first connecting arm of the plurality of connecting arms 102 is used to connect the plurality of upper propellers 40, and a second connecting arm of the plurality of connecting arms 102 is used to connect the plurality of lower propellers 50. An edge of the energy load module 70 extends to the plurality of first connection arms and is detachably connected to the plurality of first connection arms. If the size of the energy load module 70 is large and needs to be extended to the position corresponding to the connection arm 102, connecting the energy load module 70 to the connection arm 102 is convenient and reliable. In addition, compared with connecting the energy load module 70 to the second connection arm, connecting the energy load module 70 to the first connection arm is beneficial to avoiding interference between the energy load module 70 and the lower propeller 50, beneficial to protecting the lower propeller 50, and beneficial to improving the reliability of the multi-rotor aircraft.

In other alternative embodiments, the energy load module 70 may be assembled with the frame 10 and provided above the frame 10. At this time, the multi-rotor aircraft comprises an upper part and a lower part which are detachably connected, wherein the upper layer part comprises the frame 10, the plurality of upper propellers 40, the plurality of upper power sources 20, the plurality of lower propellers 50, the plurality of lower power sources 30 and the energy load module 70, the energy load module 70 is used to supply power to the upper power source 20 and the lower power source 30, and the energy load module 70 is connected above the frame 10. The lower part comprises a landing gear 60 and a load, and the landing gear 60 and the load are connected below the frame 10.

In the multi-rotor aircraft with a multi-axis misalignment layout, the upper propellers 40 and the lower propellers 50 are staggered so that the pitch between the upper propellers 40 and the lower propellers 50 is large. The central axis of the upper power sources 20 and the central axis of the lower power sources 30 are not collinear or overlapped. In the vertical projection direction of the frame 10, the overlapping area between the upper propellers 40 and the lower propellers 50 is less. Compared with the coaxial multi-rotor aircraft with 4 shafts and 8 propellers in the prior art, the vertical difference between the upper propellers 40 and the lower propellers 50 of the multi-rotor aircraft with a multi-axis misalignment layout is larger, the mutual disturbance between the propellers is smaller, the propeller efficiency is higher, the corresponding propeller rotating speed is lower, and the noise is lower. Compared with the multi-rotor aircraft with 8 shafts and 8 propellers in the prior art, the overall size of the multi-rotor aircraft with a multi-axis misalignment layout is greatly reduced, and the fuselage weight, volume and flight resistance are also significantly reduced. In addition, compared with the multi-rotor aircraft with 4 shafts and 8 propellers, the frame 10 of the multi-rotor aircraft with the multi-axis misalignment layout is no longer a cantilever structure, but also can improve the rigidity of the fuselage and reduce vibration resulted from deformation of the aircraft itself. Therefore, compared with the multi-rotor aircraft in the prior art, the multi-rotor aircraft with the multi-axis misalignment layout can significantly reduce flight resistance and volume, and improve propeller efficiency and the rigidity of the fuselage at the same load capacity.

Although the specific embodiments of the present invention have been described above, those skilled in the art should understand that this is merely an example, and the protection scope of the present invention is defined by the appended claims. Those skilled in the art can make various changes or modifications to these embodiments without departing from the principle and essence of the present invention, but these changes and modifications fall within the protection scope of the present invention.

What is claimed is:

1. A multi-rotor aircraft with a multi-axis misalignment layout comprising:
    a frame including a plurality of reinforcing arms, and a plurality of connecting arms;
a plurality of upper power sources, and;
a plurality of lower power sources;
    a plurality of upper propellers, which are provided at intervals and are connected above a highest point of the frame through the plurality of upper power sources; and
    a plurality of lower propellers, which are provided at intervals and are connected below a lowest point of the frame through the plurality of lower power sources;
    wherein a vertical projection direction of the frame, the plurality of upper propellers and the plurality of lower propellers are staggered;
    wherein each of said connecting arms has a first end and second end, the second end of each said connecting arms is connected to at least one reinforcing arm;
    wherein the first end and second end of each connecting arm is at a different height from each other;
    wherein the plurality of upper propellers and the plurality of lower propellers are horizontally staggered.

2. The multi-rotor aircraft with a multi-axis misalignment layout according to claim 1, wherein a misalignment angle is formed between the connection between the center of any one of the upper propellers and the center of an adjacent one of the lower propellers and the horizontal plane of the frame, and the range of the misalignment angles is 0° to 89°.

3. The multi-rotor aircraft with a multi-axis misalignment layout according to claim 1, wherein the connection between the center of any one of the lower propellers and the center of two adjacent upper propellers forms a triangle.

4. The multi-rotor aircraft with a multi-axis misalignment layout according to claim 1, wherein the plurality of upper propellers and the plurality of lower propellers are staggered horizontally and equidistantly.

5. The multi-rotor aircraft with a multi-axis misalignment layout according to claim 1, wherein the frame comprises:
    a frame center part;
    wherein the first end of each of the plurality of connecting arms is connected to the frame center part, and the second end of each of the plurality of connecting arms is correspondingly connected to either a upper power source or a lower power source.

6. The multi-rotor aircraft with a multi-axis misalignment layout according to claim 5, wherein the reinforcing arm is provided in each of the accommodation areas formed between the plurality of connecting arms.

7. The multi-rotor aircraft with a multi-axis misalignment layout according to claim 6, wherein the connecting arm, the reinforcing arm, and the frame center part are formed as an integrated structure through a detachable or fixed connection.

8. The multi-rotor aircraft with a multi-axis misalignment layout according to claim 6, wherein the connecting arm is integrally formed with the reinforcing arm and the frame center part.

9. The multi-rotor aircraft with a multi-axis misalignment layout according to claim 5, wherein the upper propeller and the upper power source are connected to the top of the corresponding connecting arm, and the lower propeller and the lower power source are connected to the bottom of the corresponding connecting arm.

10. The multi-rotor aircraft with a multi-axis misalignment layout according to claim 1, wherein the multi-rotor aircraft comprises an upper part and a lower part which are detachably connected;
    wherein the upper part comprises the frame, the plurality of upper propellers, the plurality of upper power sources, the plurality of lower propellers, and the plurality of lower power sources;
    the lower part comprises a landing gear and an operating load unit which are connected, the operating load unit comprises a load and an energy load module, the energy load module is configured to supply power to the upper power source and the lower power source, the load and the landing gear are connected to the energy load module, and the energy load module is detachably connected below the frame.

11. The multi-rotor aircraft with a multi-axis misalignment layout according to claim 10, wherein the frame further comprises: a frame center part and a plurality of connecting arms, the connecting arm have a first end and a second end in an extending direction, the first end of the plurality of connecting arms is connected to the frame center part, and the second end of the plurality of connecting arms is correspondingly connected with the plurality of upper power sources, the plurality of upper propellers, the plurality of lower power sources, and the plurality of lower propellers;
    wherein a first connecting arm of the plurality of connecting arms is used to connect the plurality of upper propellers, and a second connecting arm of the plurality of connecting arms is used to connect the plurality of lower propellers;
    an edge of the energy load module extends to the plurality of first connection arms and is detachably connected to the plurality of first connection arms.

12. The multi-rotor aircraft with a multi-axis misalignment layout according to claim 1, wherein the number of the upper propellers and the number of the lower propellers are both four.

* * * * *